(12) United States Patent
Paukner et al.

(10) Patent No.: US 12,384,357 B2
(45) Date of Patent: *Aug. 12, 2025

(54) METHOD FOR OPERATING A HYBRID DRIVE SYSTEM OF A MOTOR VEHICLE, HYBRID DRIVE SYSTEM, AND MOTOR VEHICLE

(71) Applicant: Volkswagen Aktiengesellschaft, Wolfsburg (DE)

(72) Inventors: Stefan Paukner, Wolfsburg (DE); Falk-Christian Von Ceumern-Lindenstjerna, Braunschweig (DE); Johannes Westendorf, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 185 days.

This patent is subject to a terminal disclaimer.

(21) Appl. No.: 18/112,248

(22) Filed: Feb. 21, 2023

(65) Prior Publication Data

US 2023/0264679 A1    Aug. 24, 2023

(30) Foreign Application Priority Data

Feb. 22, 2022    (DE) .................. 10 2022 104 182.4

(51) Int. Cl.
*B60W 20/15*    (2016.01)
*B60W 10/02*    (2006.01)
(Continued)

(52) U.S. Cl.
CPC ............ *B60W 20/15* (2016.01); *B60W 10/02* (2013.01); *B60W 10/06* (2013.01); *B60W 10/18* (2013.01);
(Continued)

(58) Field of Classification Search
CPC ...... B60W 20/15; B60W 10/02; B60W 10/06; B60W 10/18; B60W 2710/021;
(Continued)

(56) References Cited

U.S. PATENT DOCUMENTS

| 6,616,570 B2 | 9/2003 | Wakashiro et al. |
| 2004/0025835 A1 | 2/2004 | Sieber et al. |

(Continued)

FOREIGN PATENT DOCUMENTS

| DE | 60223858 T2 | 4/2008 | |
| DE | 102004048606 B4 * | 5/2019 | ............... B60K 6/48 |

(Continued)

OTHER PUBLICATIONS

Extended European Search Report dated Jun. 26, 2023 in corresponding application 23153275.5.

*Primary Examiner* — Anne Marie Antonucci
*Assistant Examiner* — Jewel Ashley Kuntz
(74) *Attorney, Agent, or Firm* — Muncy, Geissler, Olds & Lowe, P.C.

(57) ABSTRACT

A method for operating a hybrid drive system of a motor vehicle, in which an internal combustion engine with a belt-driven starter generator coupled thereto is operated in an overrun mode for braking of the motor vehicle, wherein, in order to avoid a delivering of air to an exhaust system of the hybrid drive system, the internal combustion engine is configured in such a manner that intake valves and/or exhaust valves of the internal combustion engine remain closed during a rotation of a crankshaft of the internal combustion engine. Also provided is a hybrid drive system for a motor vehicle and to a motor vehicle having a hybrid drive system.

10 Claims, 3 Drawing Sheets

(51) Int. Cl.
*B60W 10/06* (2006.01)
*B60W 10/18* (2012.01)
(52) U.S. Cl.
CPC ... *B60W 2710/021* (2013.01); *B60W 2710/06* (2013.01)
(58) Field of Classification Search
CPC .. B60W 2710/06; B60W 10/08; B60W 20/14; B60W 20/40; Y02T 10/62; B60K 6/387; B60K 2006/4808; B60K 6/48
See application file for complete search history.

(56) References Cited

U.S. PATENT DOCUMENTS

| | | |
|---|---|---|
| 2008/0185194 A1 | 8/2008 | Leone |
| 2009/0098976 A1* | 4/2009 | Usoro .................... B60K 6/547 903/905 |
| 2011/0053735 A1* | 3/2011 | Lewis ................... F02D 41/126 477/99 |
| 2015/0239463 A1 | 8/2015 | Ohmura et al. |
| 2016/0032845 A1* | 2/2016 | Boyer ................. F02D 41/0087 123/58.1 |
| 2016/0251012 A1* | 9/2016 | Schneider ............. F01N 3/2066 701/22 |
| 2021/0381446 A1* | 12/2021 | Etzel ................... B60W 30/192 |
| 2022/0024441 A1 | 1/2022 | Jun et al. |

FOREIGN PATENT DOCUMENTS

| | | |
|---|---|---|
| DE | 102018206057 A1 | 10/2019 |
| GB | 2446270 A | 8/2008 |
| JP | 2009292246 A | 12/2009 |

\* cited by examiner

METHOD FOR OPERATING A HYBRID DRIVE SYSTEM OF A MOTOR VEHICLE, HYBRID DRIVE SYSTEM, AND MOTOR VEHICLE

This nonprovisional application claims priority under 35 U.S.C. § 119(a) to German Patent Application No. 10 2022 104 182.4, which was filed in Germany on Feb. 22, 2022, and which is herein incorporated by reference.

BACKGROUND OF THE INVENTION

Field of the Invention

The present invention relates to a method for operating a hybrid drive system of a motor vehicle. The invention additionally relates to a hybrid drive system for a motor vehicle, and to a motor vehicle having a hybrid drive system.

Description of the Background Art

Motor vehicles with hybrid drive systems are known in which the hybrid drive system has an internal combustion engine, a transmission, a drivetrain generator, an exhaust system for the internal combustion engine, and a control device. Arranged between the internal combustion engine and an output of the hybrid drive system is a first clutch. Arranged between the drivetrain generator and the output is a second clutch. A generic drive system is known from the documents US 2015/0239463 A1 and JP 2009-292246 A1, for example. The drivetrain generator is arranged in series with the internal combustion engine so that the drivetrain generator, together with the internal combustion engine, is uncoupled from the output when the second clutch is disengaged.

Furthermore, hybrid drive systems are known that, in addition to a drivetrain generator, also have a belt-driven starter generator, which is coupled to the internal combustion engine directly or indirectly, for example through a transmission. The belt-driven starter generator, together with the internal combustion engine, can be uncoupled from the output, and consequently also from the drivetrain generator, by means of the first clutch.

Furthermore, hybrid drive systems often have a spark-ignition engine as the internal combustion engine, as well as a three-way catalytic converter, and often a particulate filter in addition, for purifying the emissions of the spark-ignition engine. Modern hybrid drive systems have two three-way catalytic converters, of which a first three-way catalytic converter is arranged in the vicinity of the internal combustion engine and a second three-way catalytic converter is arranged in an underbody position of the motor vehicle.

Known hybrid drive systems have the disadvantage that air is drawn in through the internal combustion engine and fed into the exhaust system in an operating state in which the internal combustion engine does not deliver any thrust and is being overrun by the output. In this case, oxygen builds up in the three-way catalytic converters, which leads to increased emission levels, in particular NOx emissions, when the internal combustion engine begins operation. Until now, this problem has been solved by intentionally burning off the oxygen from the three-way catalytic converters. This, in turn, leads to increased fuel consumption of the hybrid drive system.

SUMMARY OF THE INVENTION

It is therefore an object of the present invention to remedy or to at least partially remedy the above-described disadvantages in a hybrid drive system. In particular, it is an object of the present invention to create a method for operating a hybrid drive system, as well as a hybrid drive system and a motor vehicle, which avoid oxygen buildup in the three-way catalytic converter in a simple and economical manner.

Accordingly, in an exemplary embodiment, the object is attained by a method for operating a hybrid drive system of a motor vehicle, by a hybrid drive system for a motor vehicle, and by a motor vehicle. Of course, features and details that are described in connection with the method according to the invention also apply in connection with the hybrid drive system according to the invention as well as the motor vehicle according to the invention, and vice versa in each case, so mutual reference is or can always be made with regard to the disclosure of the individual aspects of the invention.

According to an example of the invention, the object is attained by a method for operating a hybrid drive system of a motor vehicle. The hybrid drive system has an internal combustion engine with a belt-driven starter generator coupled thereto, a transmission, a drivetrain generator, an exhaust system for the internal combustion engine, a control device, and an output. A first clutch is arranged between the internal combustion engine and the transmission. An optional second clutch can be arranged between the drivetrain generator and the output. The method comprises: the control device bringing the motor vehicle to a first speed by controlling the internal combustion engine and/or the drivetrain generator, the control device bringing about an operating state of the hybrid drive system in which the first clutch is disengaged, the control device shutting off the internal combustion engine, the control device detecting a braking demand for braking of the motor vehicle, the control device engaging the first clutch for overrunning the internal combustion engine as well as for operating the belt-driven starter generator in a recuperation mode, and the control device configuring the internal combustion engine in such a manner that intake valves and/or exhaust valves of the internal combustion engine remain closed during a rotation of a crankshaft of the internal combustion engine.

The hybrid drive system with which the method according to the invention is carried out has the internal combustion engine with the belt-driven starter generator coupled thereto. The internal combustion engine is designed to drive the motor vehicle. Preferably, the internal combustion engine is designed as a spark-ignition engine. The belt-driven starter generator preferably is mechanically coupled to the crankshaft of the internal combustion engine by a transmission, such as, e.g., a single-stage gear transmission, a belt drive, or the like. According to the invention, an intermediate clutch can be provided in the torque flow between the belt-driven starter generator and the internal combustion engine to mechanically decouple the belt-driven starter generator from the crankshaft. The belt-driven starter generator is an electric motor that is designed to operate in a motor mode as well as a generator mode. The belt-driven starter generator is designed to convert electrical energy into rotational kinetic energy in motor mode. In this way, additional torque can be provided to support the internal combustion engine for driving the motor vehicle. Furthermore, the belt-driven starter generator is designed to convert rotational kinetic energy into electrical energy in generator mode. In this way, electrical energy can be provided for storage in a battery of the motor vehicle or for operating the drivetrain generator.

The internal combustion engine is mechanically coupled to the output of the hybrid drive system by the first clutch and the transmission. When the first clutch is engaged, a torque can be transmitted from the crankshaft of the internal combustion engine to the output through the transmission. When the first clutch is disengaged, the transmission of torque is interrupted. In this state, the combustion engine can be switched off or is designed to operate the belt-driven starter generator in generator mode, for example. In addition, the internal combustion engine is designed to be configurable in such a manner that intake valves and/or exhaust valves of the internal combustion engine can be switched in a way that is decoupled from a rotation of the crankshaft. Consequently, the intake valves or exhaust valves can be closed over multiple rotations of the crankshaft or over a relatively long period of time, for example when the crankshaft is rotating. In this way, it is possible to prevent the switched-off combustion engine in an overrun state from delivering air to the exhaust system for the internal combustion engine of the hybrid drive system. Preferably, the internal combustion engine is designed such that at least the intake valves can be closed in a manner that is decoupled from the rotation of the crankshaft.

The exhaust system is coupled in fluid communication to a combustion gas outlet of the internal combustion engine. Combustion gases from cylinders of the internal combustion engine can be discharged to an environment of the motor vehicle through the exhaust system. Preferably, the exhaust system has a particulate filter such as, e.g., a gasoline particulate filter, and a catalytic converter such as, e.g., a three-way catalytic converter. Provision can be made according to the invention that the exhaust system has multiple particulate filters and/or multiple catalytic converters or other devices for purifying the emissions. Preferably, the exhaust system has a first close-coupled three-way catalytic converter and a second three-way catalytic converter adjacent to a vehicle floor. It is preferred in this case that the particulate filter, which preferably is designed as a gasoline particulate filter, is arranged between the first three-way catalytic converter and the second three-way catalytic converter in the direction of flow of the exhaust gas.

The drivetrain generator is mechanically coupled to the output of the hybrid drive system, for example directly or through an optional second clutch. A torque for driving the motor vehicle can be transmitted to the output by means of the drivetrain generator. The drivetrain generator is preferably arranged between a transmission output of the transmission and the optional second clutch. Alternatively, the drivetrain generator can also be arranged between the first clutch and a transmission input of the transmission. It is preferred in this context for the transmission to be arranged between the drivetrain generator and the optional second clutch. In an alternative embodiment of the invention, the drivetrain generator and the optional second clutch are mechanically coupled to the output in such a manner that the drivetrain generator is decoupled from the output when the second clutch is disengaged, and the internal combustion engine is coupled to the drive when the first clutch is engaged at the same time. In the event of this configuration, a third clutch is preferably provided, by which means it is possible to decouple the internal combustion engine with belt-driven starter generator, the first clutch, the second clutch, the transmission, and the drivetrain generator from the output.

The control device is designed to operate the hybrid drive system. The execution of the method according to the invention can therefore be coordinated by means of the control device. This means that commands to components of the hybrid drive system, such as, e.g., an injection pump for injecting fuel into the cylinders of the internal combustion engine, the transmission for setting a selected gear, the first clutch, the optional second clutch, the intake valves, the exhaust valves, the drivetrain generator, and the belt-driven starter generator, can be generated and preferably also can be transmitted by means of the control device in order to carry out individual aspects of the method according to the invention. Moreover, the control device is designed to receive commands for operating the hybrid drive system, such as, e.g., a speed command from an accelerator pedal, from a limiting device for observing legal speed limits, from an input interface of a speed regulating device or the like, as well as a braking command from a brake pedal, from the limiting device, from the input interface of the speed regulating device, or the like. Moreover, the control device is preferably designed to monitor the hybrid drive system, such as, e.g., monitoring rotational speeds, temperatures, configurations, or the like of individual or multiple components of the hybrid drive system.

To start with, the motor vehicle is brought to the first speed. This is preferably accomplished by accelerating the motor vehicle from a lower speed to the first speed. In this case, preferably the internal combustion engine and/or the drivetrain generator is/are controlled by the control device accordingly. Bringing the vehicle to the first speed can likewise be accomplished by decelerating it from a higher speed to the first speed. In this case, preferably a conventional braking device of the motor vehicle, such as a disk brake device, a drum brake device, or the like, is controlled by the control device to brake the motor vehicle. As an alternative to braking, the first speed can also be reached by allowing the motor vehicle to coast. The first speed is preferably higher than 50 km/h, and especially preferably higher than 100 km/h.

At the first speed, the control device brings about the operating state of the hybrid drive system in which the first clutch is disengaged. This can be accomplished by selectively disengaging the first clutch, for example. An optional second clutch is likewise disengaged in this operating state. This can be accomplished by selectively disengaging the second clutch, for example. Alternatively, the first clutch can already be disengaged. A disengaged clutch is understood within the scope of the invention to mean a decoupled position of the clutch so that a torque flow through the clutch is interrupted. An engaged clutch is understood within the scope of the invention to be a coupled position of the clutch so that a torque flow through the clutch is established.

The internal combustion engine is shut off by means of the control device. This can be accomplished before or after disengaging the first clutch, for example. Preferably, shutoff of the internal combustion engine takes place after disengagement of the first clutch. Shutoff of the internal combustion engine is understood within the scope of the invention to mean that the internal combustion engine is no longer being operated in combustion-engine operation, so that the internal combustion engine provides no torque—aside from a moment of inertia of the still-rotating crankshaft—to drive the belt-driven starter generator or the motor vehicle.

If a braking demand for braking the motor vehicle is now produced, this is detected by the control device. The braking demand can be made, for example, by the actuation of the brake pedal by a driver of the motor vehicle, a manual input at the input interface of the cruise control device, the limiting device for observing legal speed limits, or the like.

The control device analyzes the braking demand and performs actions to decelerate the motor vehicle in accordance with the braking demand.

An action performed within this framework is the engagement of the first clutch by the control device, so that the crankshaft of the internal combustion engine is mechanically coupled to the output of the hybrid drive system for the transmission of torque. Depending on the design of the hybrid drive system, an engagement of the optional second clutch may also be necessary to establish this operating state. The internal combustion engine is thus in an overrun mode and is driven through the output. The belt-driven starter generator that is mechanically coupled to the internal combustion engine is therefore being operated in recuperation mode and converts rotational kinetic energy into electrical energy. In this case, the internal combustion engine and the belt-driven starter generator provide a braking torque for braking the motor vehicle. In addition, an actuation of an additional, conventional braking device, such as a disk brake device, a drum brake device, or the like, can take place to brake the motor vehicle if the braking torque provided is not sufficiently high to meet the braking demand.

Another action performed within this framework comprises configuring of the internal combustion engine by the control device in such a manner that the intake valves and/or the exhaust valves of the internal combustion engine remain closed during a rotation of the crankshaft of the internal combustion engine. Preferably, at a minimum the intake valves alone are closed. For this purpose, the intake valves or the exhaust valves are designed to be selectively electrically controllable, for example, so that no mechanical forced coupling exists between the rotation of the crankshaft and the intake valves or the exhaust valves. Alternatively, the intake valves or the exhaust valves can also be designed such that they can be uncoupled from a camshaft of the internal combustion engine. Consequently, a valve position of the intake valves or of the exhaust valves also remains constant, in particular closed, during a rotation of the crankshaft. As a result, no air is drawn in by the internal combustion engine and pumped into the exhaust system during overrunning of the internal combustion engine.

A method according to the invention for operating a hybrid drive system of a motor vehicle has the advantage over conventional methods that the belt-driven starter generator can be operated in recuperation mode with simple means and in an economical manner, wherein a delivering of air to the exhaust system is avoided by the selective configuration of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

Provision can also be made in the method that the control device specifically configures the internal combustion engine in overrun in such a manner that the intake valves and exhaust valves deliver a predefined air flow into the exhaust system of the motor vehicle. This configuration preferably takes place shortly before a starting of the internal combustion engine. Further preferably, this configuration can take place at a vehicle speed at which the performance of this configuration can be carried out in an especially protective and low-wear manner. This has the advantage that a starting process of the internal combustion engine in a rolling motor vehicle can be improved with simple means and in an economical manner. Furthermore, combustion gas residues can be removed from the cylinders as a result.

The control device can control a fuel injection device for the selective injection of fuel into one or more cylinders of the internal combustion engine in overrun. The internal combustion engine is in an overrun mode, at least at the beginning of the selective injection, so that the fuel/air mixture in the cylinders does not ignite. This likewise preferably takes place shortly before a starting of the internal combustion engine. This has the advantage that the starting process of the internal combustion engine in a rolling motor vehicle can be improved with simple means and in an economical manner. Furthermore, a selective burnoff of oxygen from exhaust gas processing devices of the exhaust system, such as catalytic converters, particulate filters, and the like, can be achieved as a result.

The drivetrain generator can be mechanically coupled to the output of the hybrid drive system through a second clutch, wherein the control device engages the second clutch to operate the drivetrain generator in recuperation mode for braking the motor vehicle. In a hybrid drive system in which the first clutch and the second clutch are arranged in the torque flow between the internal combustion engine and the output, the second clutch must be engaged before the first clutch, because in this configuration both the first clutch and the second clutch must be engaged to transmit a drive torque from the internal combustion engine to the output. By engaging the second clutch, the drivetrain generator provides a braking torque and generates electrical energy in doing so. After the subsequent engagement of the first clutch, the internal combustion engine and the belt-driven starter generator provide an additional braking torque, so that a higher total braking torque is provided. In a hybrid drive system in which the first clutch is arranged in the torque flow between the internal combustion engine and the output, and the second clutch is arranged parallel to the first clutch in the torque flow between the drivetrain generator and the output, the engagement of the second clutch can, according to the invention, take place independently of a time of the engagement of the first clutch, for example before, after, or at the same time. This has the advantage that a recuperation output for braking the motor vehicle can be maximized with simple means and in an economical manner.

Provision can be made in a method that the second clutch may be engaged before the first clutch for braking the motor vehicle. Consequently, a braking torque is initially provided by the drivetrain generator. An additional braking torque can be provided by the internal combustion engine and the belt-driven starter generator by means of subsequent engagement of the first clutch. This has the advantage that especially smooth braking and an especially efficient recuperation, in particular for relatively low braking demands, are ensured with simple means and in an economical manner.

The first clutch can be disengaged again when the motor vehicle reaches a second speed, wherein the second speed is lower than the first speed. Preferably the second speed is between 15 km/h and 30 km/h, especially preferably between 20 km/h and 25 km/h. Efficient recuperation by the belt-driven starter generator is no longer ensured below such a speed. As a result of disengaging the first clutch, recuperation now takes place only through the drivetrain generator. Any additional braking torque required can be produced by a braking device, such as a disk brake device, a drum brake device, or the like. This has the advantage that especially smooth braking and an especially efficient recuperation are ensured with simple means and in an economical manner.

The configuring of the internal combustion engine by the control device can include a switching of a camshaft to null cams. Such switchable cams are already known in drive systems for motor vehicles that can be operated with a reduced number of cylinders in order to reduce fuel consumption and exhaust-emission output. In this case, the cams of the cylinders to be shut off can be decoupled from the camshaft so that the intake valves and/or exhaust valves of the shut-off cylinders remain in their positions, such as a closed position, during a rotation of the camshaft. The shut-off cylinders can be activated again in the event of an increased power output requirement such as, e.g. a kickdown, by coupling the respective cams to the camshaft. This has the advantage that especially reliable closing of the intake valves or exhaust valves is ensured with simple means and in an economical manner.

Air can be evacuated from the exhaust system with an evacuation device of the hybrid drive system. As an alternative or in addition, an oxygen-free or oxygen-reduced gas is preferably introduced into the exhaust system by means of a gas supply device of the hybrid drive system to displace the oxygen located in the exhaust system. The evacuation device preferably has a vacuum chamber to hold the air. The evacuation device is preferably designed to evacuate the vacuum chamber again in combustion-engine operation of the internal combustion engine. The gas supply device preferably has a pressure chamber in which the gas can be stored. Preferably, the gas supply device is designed to fill the pressure chamber with exhaust gas of the internal combustion engine, preferably at a pressure above atmospheric pressure, in particular several times above atmospheric pressure, in combustion-engine operation of the internal combustion engine. This has the advantage that oxygen residues can be removed from the exhaust system with simple means and in an economical manner.

Furthermore, the object can also be attained by a hybrid drive system for a motor vehicle. The hybrid drive system has an internal combustion engine with a belt-driven starter generator coupled thereto, a transmission, a drivetrain generator, an exhaust system for the internal combustion engine, and a control device. Arranged between the internal combustion engine and an output of the hybrid drive system is a first clutch. An optional second clutch can be arranged between the drivetrain generator and the output. In accordance with the invention, the hybrid drive system according to the invention is designed to carry out a method according to the first aspect of the invention. The individual components of the hybrid drive system have already been described sufficiently in connection with the method according to the invention.

All the advantages already described with respect to a method for operating a hybrid drive system of a motor vehicle according to the first aspect of the invention also arise in the hybrid drive system according to the invention. Accordingly, the hybrid drive system according to the invention has the advantage over conventional hybrid drive systems that the belt-driven starter generator can be operated in recuperation mode with simple means and in an economical manner, wherein a delivering of air to the exhaust system is avoidable owing to the selective configurability of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

The object can also be attained by a motor vehicle. In accordance with the invention, the motor vehicle has a hybrid drive system according to the second aspect of the invention. Accordingly, the hybrid drive system has an internal combustion engine with a belt-driven starter generator coupled thereto, a transmission, a drivetrain generator, an exhaust system for the internal combustion engine, and a control device. Arranged between the internal combustion engine and an output of the hybrid drive system is a first clutch. Arranged between the drivetrain generator and the output is a second clutch. In accordance with the invention, the hybrid drive system is designed to carry out a method according to the first aspect of the invention.

All the advantages already described with respect to a method for operating a hybrid drive system of a motor vehicle according to the first aspect of the invention and with respect to a hybrid drive system for a motor vehicle according to the second aspect of the invention also arise in the motor vehicle according to the invention. Accordingly, the motor vehicle according to the invention has the advantage over conventional motor vehicles that the belt-driven starter generator can be operated in recuperation mode with simple means and in an economical manner, wherein a delivering of air to the exhaust system is avoidable owing to the selective configurability of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
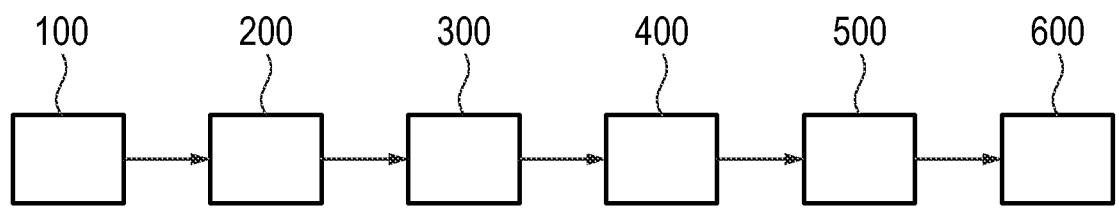
FIG. 1 is an example of a method according to the invention for operating a hybrid drive system of a motor vehicle in a flowchart.

In FIG. 1, an example of a method according to the invention for operating a hybrid drive system 1 (see FIG. 2) of a motor vehicle 2 (see FIG. 6) is represented schematically in a flowchart. Within the framework of a first method action 100, the hybrid drive system 1 is controlled by means of a control device 8 (see FIG. 2) of the hybrid drive system 1 in such a manner that the motor vehicle 2 is brought to a first speed. This is preferably accomplished by acceleration of the motor vehicle 2. According to a second method action 200, an operating state of the hybrid drive system 1, in which a first clutch 10 of the hybrid drive system 1 is disengaged, is brought about by the control device 8. This can be accomplished by disengaging the first clutch 10, for example. Alternatively, the first clutch 10 can already be disengaged, and thus remains in the disengaged position. According to a third method action 300, the internal combustion engine 3 is shut off by means of the control device 8.

According to a fourth method action 400, a braking demand for braking the motor vehicle 2 is detected by means of the control device 8. According to a fifth method action 500, the first clutch 10 is engaged by the control device 8, so that the switched-off internal combustion engine 3 is operated in overrun. A belt-driven starter generator 4 (see FIG. 2) that is mechanically coupled to the internal combustion engine 3 is likewise operated in overrun in this case, and consequently is operated in a generator mode to generate electrical energy. Consequently, the internal combustion engine 3 and the belt-driven starter generator 4 provide a braking torque for braking the motor vehicle 2. According to a sixth method action 600, an internal combustion engine 3 of the hybrid drive system 1 is configured by means of the control device 8 in such a manner that intake valves and/or exhaust valves of the internal combustion engine 3 remain closed during a rotation of a crankshaft 12 (see FIG. 2) of the internal combustion engine 3. This is accomplished, for example, by decoupling the intake valves and/or exhaust valves from a camshaft of the internal combustion engine 3. The sixth method action 600 is preferably carried out directly or immediately after the fifth method action 500 in order to minimize a quantity of air delivered.

Figure 2:
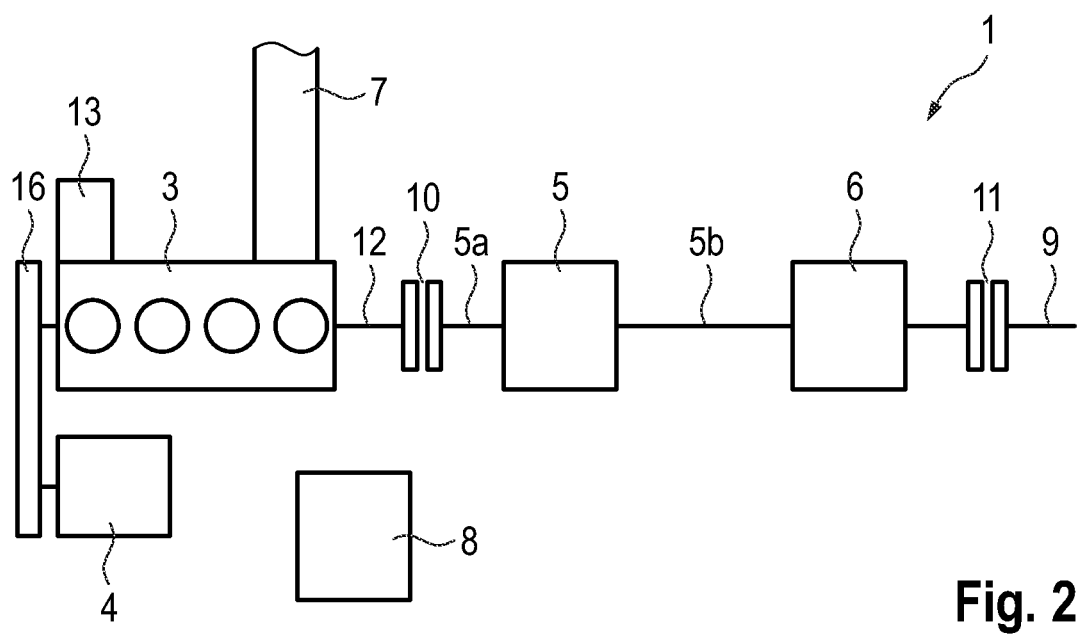
FIG. 2 is an example of a hybrid drive system according to the invention in a schematic diagram.

FIG. 2 schematically shows a preferred first embodiment of a hybrid drive system 1 according to the invention in a schematic diagram. The hybrid drive system 1 has an internal combustion engine 3, which is mechanically coupled to a belt-driven starter generator 4 by a belt drive 16. The internal combustion engine 3 has a fuel injection device 13 for injecting fuel into cylinders of the internal combustion engine 3. An exhaust system 7 of the hybrid drive system 1 is arranged on the internal combustion engine 3 for removal of the combustion gases. A crankshaft 12 of the internal combustion engine 3 can be mechanically coupled to and decoupled from a transmission input 5a of a transmission 5 by means of a first clutch 10. A drivetrain generator 6 is arranged on a transmission output 5b of the transmission 5. The drivetrain generator 6 can be mechanically coupled to and decoupled from an output 9 of the hybrid drive system 1 by means of an optional second clutch 11. The hybrid drive system 1 has a control device 8 for the purpose of controlling the components of the hybrid drive system 1. An alternative embodiment of the invention differs from the first embodiment in the feature that no second clutch 11 is present.

Figure 3:
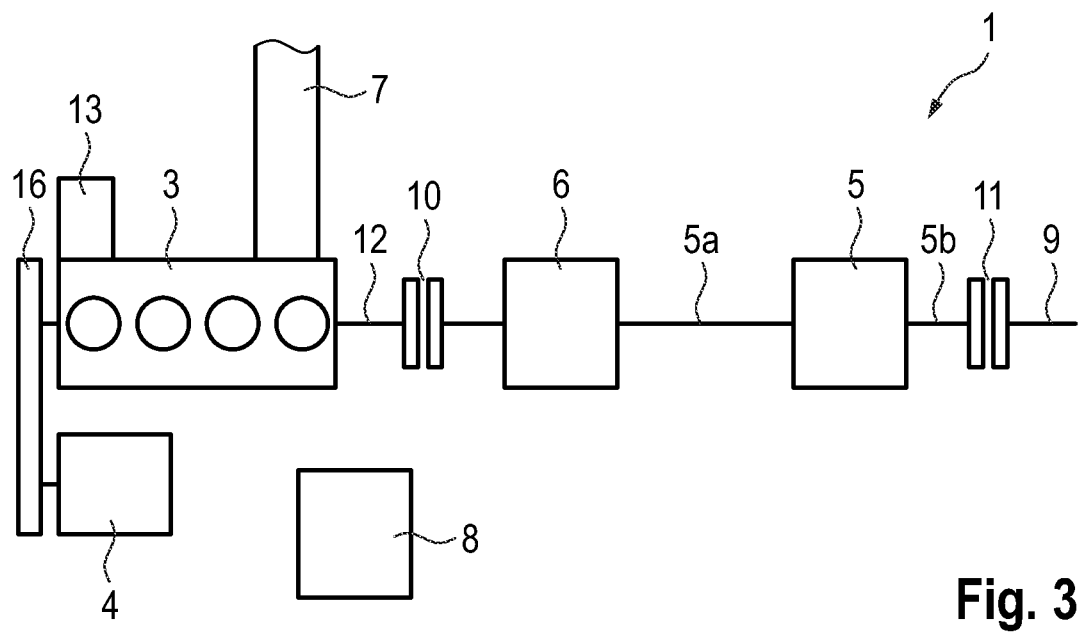
FIG. 3 is an example of a hybrid drive system according to the invention in a schematic diagram.

In FIG. 3, a second example of a hybrid drive system 1 according to the invention is schematically depicted in a schematic diagram. The second embodiment differs from the first embodiment in an arrangement of the drivetrain generator 6. The drivetrain generator 6 is arranged in the torque flow between the first clutch 10 and the transmission input 5a. An alternative embodiment of the invention differs from the second embodiment in the feature that no second clutch 11 is present.

Figure 4:
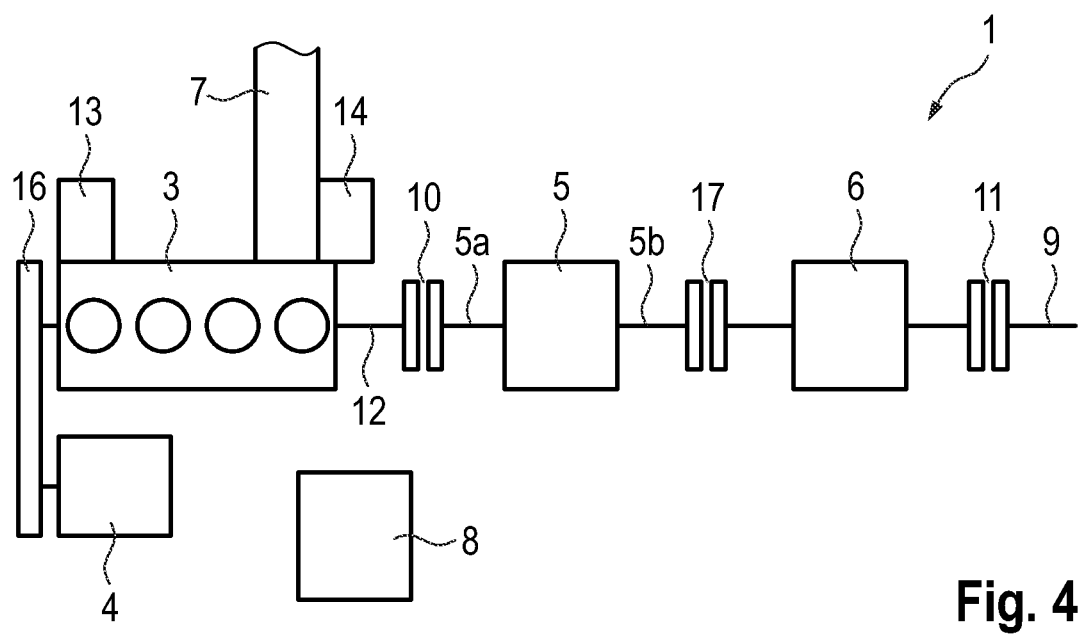
FIG. 4 is an example of a hybrid drive system according to the invention in a schematic diagram.

FIG. 4 schematically shows a third example of a hybrid drive system 1 according to the invention in a schematic diagram. The third embodiment differs from the first embodiment in a third clutch 17, which is arranged in the torque flow between the transmission output 5b and the drivetrain generator 6. The transmission 5 can be uncoupled from the drivetrain generator 6 and from the output 9 by means of the third clutch 17. Moreover, the hybrid drive system 1 has an optional evacuation device 14 for evacuating air from the exhaust system 7. An alternative embodiment of the invention differs from the third embodiment in the feature that no second clutch 11 is present.

Figure 5:
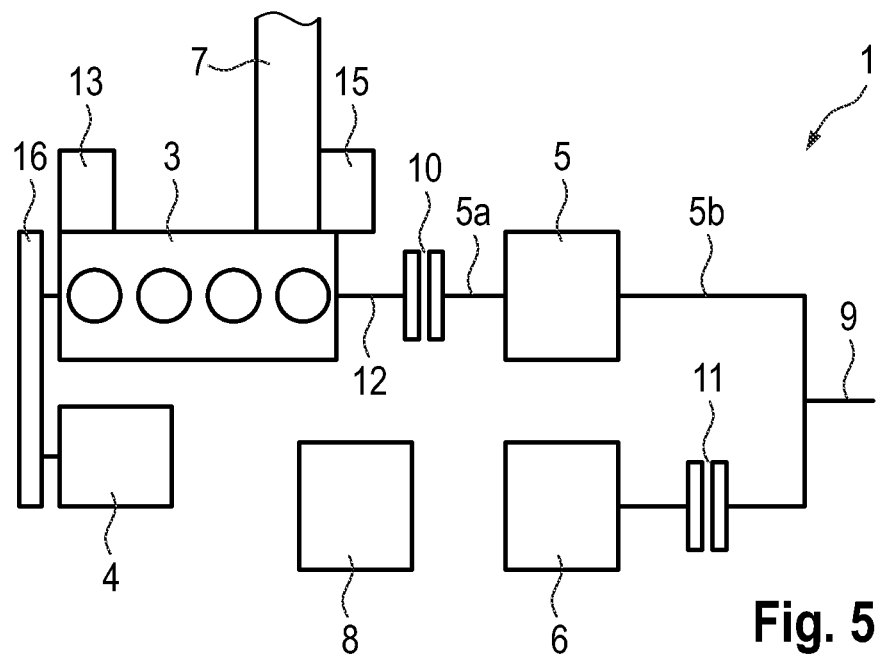
FIG. 5 is an example of a hybrid drive system according to the invention in a schematic diagram.

In FIG. 5, a fourth example of a hybrid drive system 1 according to the invention is schematically represented in a schematic diagram. The fourth embodiment differs from the first embodiment in an arrangement of the drivetrain generator 6 with the second clutch 11 that is parallel to the torque flow of the internal combustion engine 3 with the belt-driven starter generator 4 and the transmission 5. In this arrangement, the drivetrain generator 6 is mechanically decoupled from the output 9 when the second clutch 11 is disengaged, wherein the transmission 5 remains mechanically coupled to the output 9. Furthermore, the hybrid drive system 1 has an optional gas supply device 15. The gas supply device 15 is designed to store combustion gases produced in working operation of the internal combustion engine 3 at a pressure above atmospheric pressure. Furthermore, the gas supply device 15 is designed to conduct the stored exhaust gases to the exhaust system 7 when the internal combustion engine 3 is shut off. In this way, air can be displaced from the exhaust system 7. An alternative embodiment of the invention differs from the fourth embodiment in the feature that no second clutch 11 is present.

Figure 6:
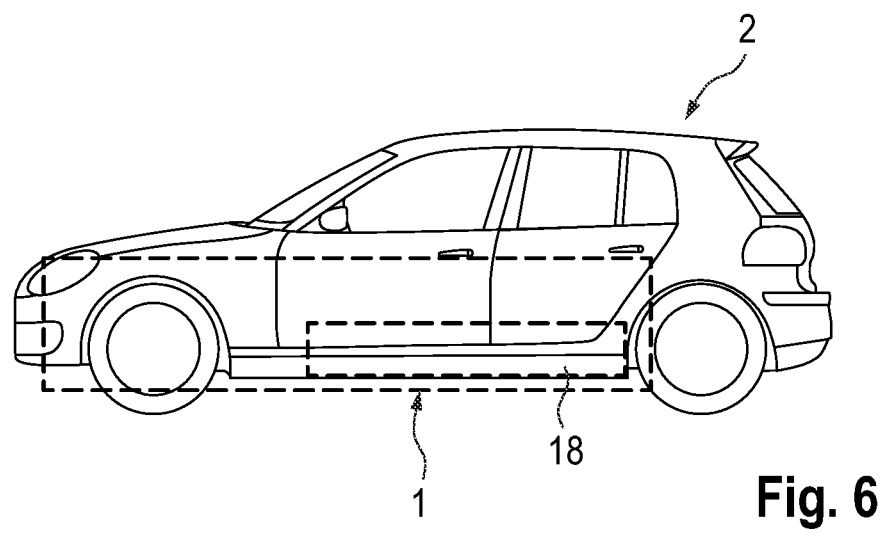
FIG. 6 is an example of a motor vehicle according to the invention in a side view.

FIG. 6 schematically shows a motor vehicle 2 according to an example of the invention in a side view. The motor vehicle 2 has a hybrid drive system 1 according to the invention with a battery 18.

The invention being thus described, it will be obvious that the same may be varied in many ways. Such as variations are not to be regarded as a departure from the spirit and scope of the invention, and all such modifications as would be obvious to one skilled in the art are to be included within the scope of the following claims.

What is claimed is:

1. A method for operating a hybrid drive system of a motor vehicle, wherein the hybrid drive system comprises an internal combustion engine with a belt-driven starter generator coupled thereto, a transmission, a drivetrain generator, an exhaust system for the internal combustion engine, a control device, an output, and a first clutch arranged between the internal combustion engine and the transmission, the method comprising:

bringing, via the control device, the motor vehicle to a first speed by controlling the hybrid drive system;

bringing about, via the control device, an operating state of the hybrid drive system in which the first clutch is disengaged;

shutting off, via the control device, the internal combustion engine;

detecting, via the control device, a braking demand for braking of the motor vehicle;

engaging, via the control device, the first clutch for overrunning the internal combustion engine as well as for operating the belt-driven starter generator in a recuperation mode; and configuring, via the control device, the internal combustion engine such that with regard to intake valves and exhaust valves of the internal combustion engine, the intake valves alone remain closed during a rotation of a crankshaft of the internal combustion engine.

2. The method according to claim 1, wherein the control device configures the internal combustion engine in overrun such that the intake valves and exhaust valves deliver a predefined air flow into the exhaust system of the motor vehicle.

3. The method according to claim 2, wherein the control device controls a fuel injection device for a selective injection of fuel into one or more cylinders of the internal combustion engine in overrun.

4. The method according to claim 1, wherein the drivetrain generator is adapted to be mechanically coupled to the output of the hybrid drive system through a second clutch, and wherein the control device engages the second clutch to operate the drivetrain generator in a recuperation mode for braking the motor vehicle.

5. The method according to claim 4, wherein the second clutch is engaged before the first clutch for braking the motor vehicle.

6. The method according to claim 1, wherein the first clutch is disengaged again when the motor vehicle reaches a second speed, and wherein the second speed is lower than the first speed.

7. The method according to claim 1, wherein the configuring of the internal combustion engine by the control device includes a switching of a camshaft to null cams.

8. The method according to claim 1, wherein air is evacuated from the exhaust system with an evacuation device of the hybrid drive system and/or wherein an oxygen-free or oxygen-reduced gas is introduced into the exhaust system by a gas supply device of the hybrid drive system to displace oxygen located in the exhaust system.

9. A hybrid drive system for a motor vehicle, the system comprising:
   an internal combustion engine with a belt-driven starter generator coupled thereto;
   a transmission;
   a drivetrain generator;
   an exhaust system for the internal combustion engine;
   a control device; and
   a first clutch arranged between the internal combustion engine and an output of the hybrid drive system,
   wherein the hybrid drive system is configured to carry out the method according to claim 1.

10. A motor vehicle comprising a hybrid drive system according to claim 9.

* * * * *